US005629818A

United States Patent [19]
Schandl et al.

[11] Patent Number: 5,629,818
[45] Date of Patent: May 13, 1997

[54] CASSETTE LOADING DEVICE HAVING DECREASED LOADING EFFORT

[75] Inventors: Hartmut Schandl, Wien, Austria; Fritz Weisser, St. Georgen, Germany

[73] Assignee: Deutsche Thomson-Brandt GmbH, Villingen-Schwenningen, Germany

[21] Appl. No.: 626,584

[22] Filed: Apr. 2, 1996

Related U.S. Application Data

[63] Continuation of Ser. No. 211,257, filed as PCT/EP92/02407, Oct. 21, 1992, published as WO93/09537, May 13, 1993, abandoned.

[30] Foreign Application Priority Data

Oct. 30, 1991 [DE] Germany .................. 41 35 834.1

[51] Int. Cl.$^6$ ................................. G11B 5/008
[52] U.S. Cl. ........................................ 360/96.5
[58] Field of Search ..................... 360/96.5, 96.6; 369/75.1, 77.2

[56] References Cited

U.S. PATENT DOCUMENTS

| 5,231,553 | 7/1993 | Weber et al. ............ 360/96.5 |
| 5,337,204 | 8/1994 | Fujii ....................... 360/96.5 |

FOREIGN PATENT DOCUMENTS

| 0150128 | 7/1985 | European Pat. Off. . |
| 0349293 | 1/1990 | European Pat. Off. . |
| 0392491 | 10/1990 | European Pat. Off. . |
| 0449330 | 10/1991 | European Pat. Off. . |
| 4010750 | 10/1990 | Germany . |
| 3864 | 1/1989 | Japan ..................... 360/96.5 |
| 321958 | 11/1992 | Japan ..................... 360/96.5 |
| 2187879 | 9/1987 | United Kingdom . |

OTHER PUBLICATIONS

Patent Abstracts of Japan, vol. 14, No. 245, 24 May 1990 & Japan A 2-62757 (Mitsubishi Electric Corp.), 2 Mar. 1990.

*Primary Examiner*—Stuart S. Levy
*Assistant Examiner*—George J. Letscher
*Attorney, Agent, or Firm*—Joseph S. Tripoli; Eric P. Herrmann; Daniel E. Sragow

[57] ABSTRACT

A cassette loading facility has a guide frame arranged on a chassis in a fixed position. A receiving device is movable between a loading position, in which a cassette can be introduced and removed therefrom, and an operating position. The cassette is positioned on the chassis by means of positioning pins and catch apertures which are formed on the cassette housing. The catch apertures lock the cassette during its transportation between the loading and the operating position and also center it in the operating position. Instead of a fixed arrangement on the drive chassis, the positioning pins are fixed on a first pivoted lever which is pivotally mounted on the cassette receiving device and which can be pivoted into a first position in which the positioning pins release the cassette so that the cassette can be introduced into the cassette receiving device and removed therefrom, and can be pivoted into a second position in which the positioning pins engage with the catch apertures of the cassette whereby the pivoting of the first pivoted lever from the first position into the second position and vice versa is carried out at the loading position of the cassette receiving device. The cassette is locked in the cassette receiving device during its loading or unloading process by the positioning pins engaging with its catch apertures. Upon reaching the operating position, the lower ends of the positioning pins each engage with correspondingly arranged centering apertures in the chassis.

5 Claims, 12 Drawing Sheets

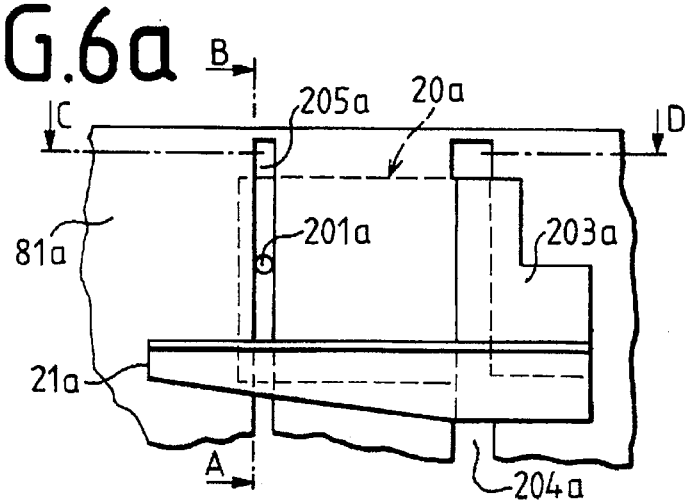
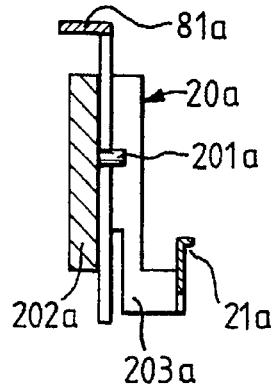
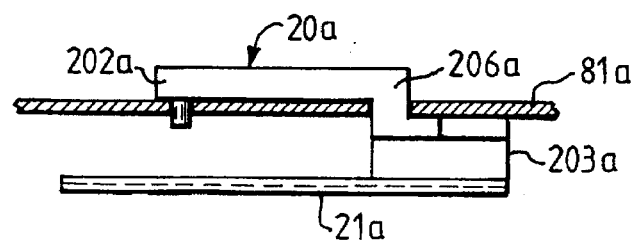
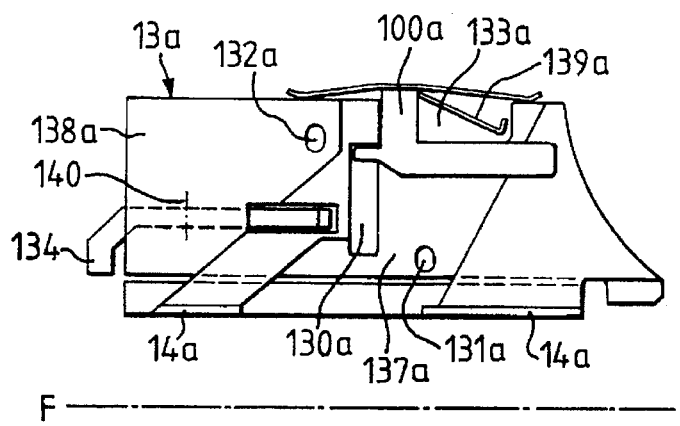
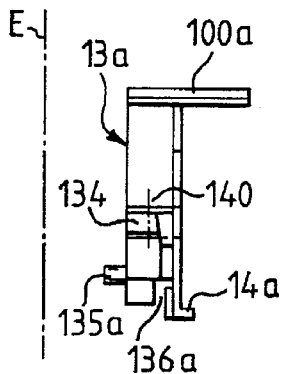
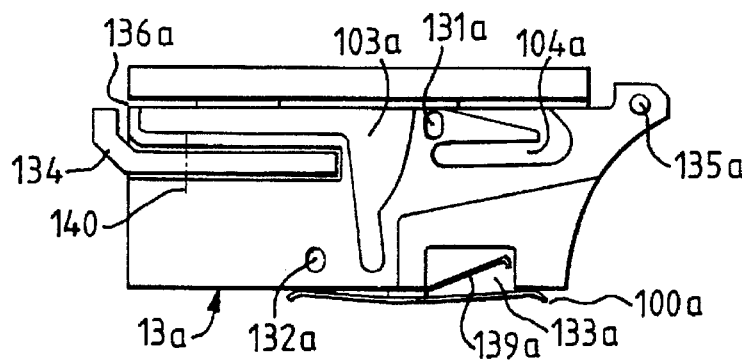

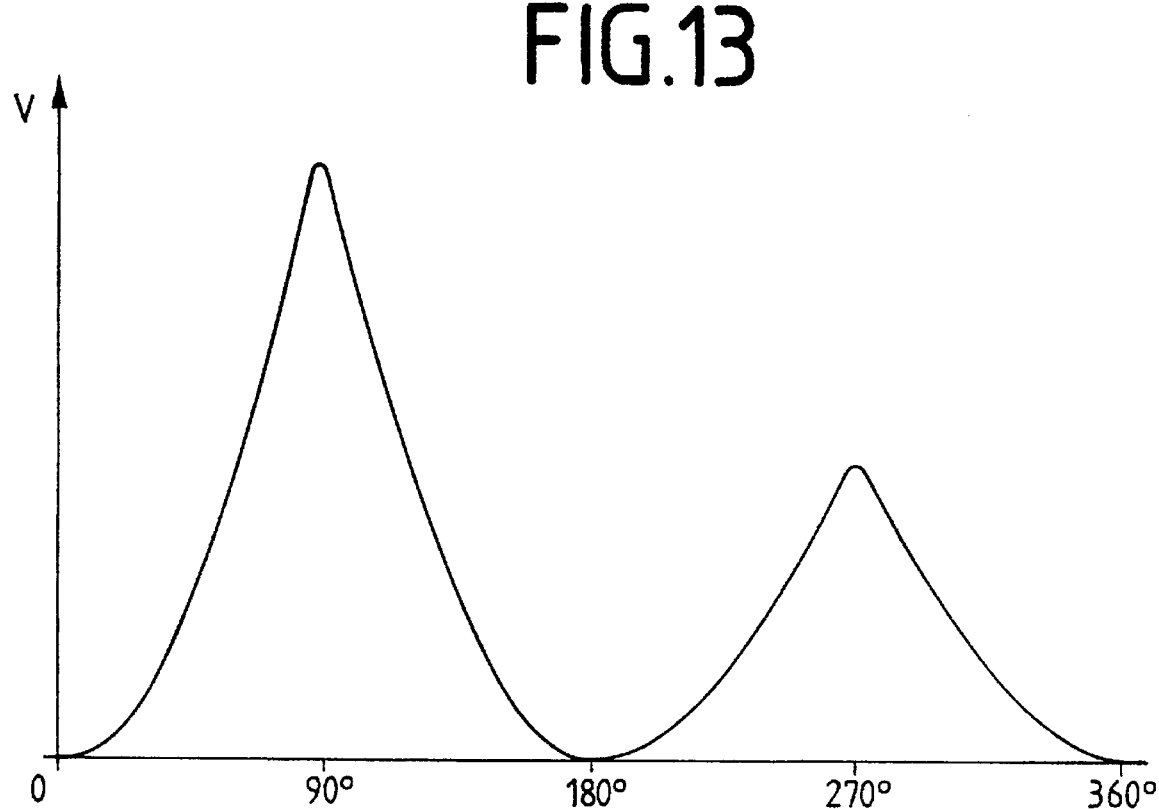

CASSETTE LOADING DEVICE HAVING DECREASED LOADING EFFORT

This is a continuation of application Ser. No. 08/211,257, filed as PCT/EP92/02407 Oct. 21, 1992 published as WO93/09537 May 13, 1993, now abandoned.

BACKGROUND OF THE INVENTION a) Field of Invention

The invention concerns a cassette loading facility for a cassette device for the recording and/or reproduction of information.

Such a cassette loading facility can be used with any audio and video device in which a storage medium for the recording and/or reproduction of information, such as a magnetic tape, magnetic disk or similar, is inserted in a cassette.

b) Description of the Prior Art

With a commercially available video recorder, for example, such a cassette loading facility essentially consists of a guide frame mounted on the drive chassis in a fixed position and a driveable cassette receiving facility which is guided in the guide frame in such a way that it can be moved between a cassette loading position and a cassette operating position. In the loading position the cassette can be inserted into or removed from the receiving facility. In the operating position the tape winding, or rather the two reel hubs of a cassette, engage with the driveable winding spindles of the drive chassis. The reel hubs are mounted in the cassette so that they may move. For the purpose of positioning the cassette relative to the plane of the chassis, catch apertures are built into the drive side of said cassette which are brought into engagement with corresponding positioning pins located on the chassis.

With such a recorder in which a cassette, for example, can be inserted through a corresponding opening in the front of the housing for the device or removed therefrom after completion of a recording, playback or rewinding operation, the loading procedure is characterized essentially by a movement of the cassette receiving facility parallel (horizontal) to the drive chassis as well as a movement perpendicular to the drive chassis. In doing this, the cassette located in the receiving facility is normally held frictionally engaged with the help of leaf springs mounted on the receiving facility. However, there is a disadvantage connected with this in that owing to the high frictional engagement forces required for holding the cassette, relatively high manual forces must be exerted in order to insert the cassette into the receiving facility or to draw it out from this. Apart from that, a precise positioning of the cassette within the receiving facility during the loading procedure is not guaranteed by the frictional engagement so that an additional orientation with the positioning pins is necessary.

A cassette loading facility is known from the patent specification DE 37 07 830 in which, to avoid the above disadvantages, the cassette receiving facility has an arresting device with a catch block which, upon feeding in a cassette, clips into a recess in the cassette in a form-fit manner so that the cassette is arrested during the entire loading procedure. The recess in the cassette is formed in the housing side of such a cassette which faces away from the drive. However, this arresting device is only applicable under certain conditions because the cassettes of other system standards, for example, the VHS standard, do not have such a recess on the side facing away from the drive.

SUMMARY OF THE INVENTION

It is, therefore, the object of the invention to create, in the case of a cassette loading facility for a cassette device, a cassette arrest for the loading or, respectively, unloading operation which is not limited to one system standard with regard to its applicability, does not require any additional means of orientation and positioning but nevertheless ensures a secure hold and a precise positioning of the cassette. In addition, the noises of the positioning and the mechanical loads on device and cassette are to be reduced while at the same time increasing the loading speed.

The idea behind the invention is, in a tape cassette for the recording and/or reproduction of information in a recorder, to utilize the catch apertures formed in the cassette housing on the drive side, which are provided for the positioning of the cassette on the drive chassis of the recorder, for also arresting the cassette during its loading or, respectively, unloading procedure.

According to the invention, instead of the above-mentioned positioning pins mounted on the drive chassis, positioning holes are provided in the drive chassis and swiveling positioning pins in the receiving device of the cassette loading facility which work together with the loading facility in such a way that upon pushing the cassette in, the positioning pins engage in the catch apertures, remain engaged in the catch apertures during the loading procedure and the other ends of which engage in the positioning holes in the chassis upon reaching the cassette operating position.

As cassettes of different system standards have such types of catch apertures which can be utilized in accordance with the invention for the cassette loading or, respectively, unloading procedure, the invention is not limited to loading facilities of one system standard, and a secure hold and precise positioning of the cassette is achieved without additional means of orientation and positioning.

A cassette loading facility having a cassette holder acting as a receiving device, in which there are provided lugs that are formed on resilient clamping members and that engage in catch apertures which are provided in the cassette housing on the driving side upon insertion of the cassette so that the cassette is locked during the loading and unloading process, is known from the JP-A-262757. Furthermore, the rear faces of the lugs are shaped such that a centering effect is exercised by them on the cassette as soon as it comes into engagement with corresponding positioning pins arranged on the drive chassis. However, on constructional grounds, a loading facility of this type is subject to a compromise, which has to be resolved, between the force required for retaining the cassette and the cassette insertion or cassette extraction force and is thus only usable to a limited extent.

The arresting of the cassette during the entire loading or unloading procedure by means of the positioning pins allows the drive speed of the receiving device to be raised with large positive and negative acceleration values, thereby considerably reducing the loading and unloading time for the cassette, and also permits the positioning noises and mechanical loads of the device and the cassette to be lowered.

DESCRIPTION OF THE DRAWINGS

In the following the invention is described by way of an embodiment example with the aid of drawings. They show:

FIGS. 6a–6c a lifting mechanism for the cassette receiving device of the cassette loading facility according to FIG. 3;

FIGS. 7a–7c a slide in the cassette receiving device of the cassette loading facility according to FIG. 3;

FIG. 13 a diagram illustrating the speed progression of the cassette receiving device for the cassette loading facility according to FIG. 3 during the loading or, respectively, unloading procedure;

DESCRIPTION OF THE PREFERRED EMBODIMENTS

Figure 1A:
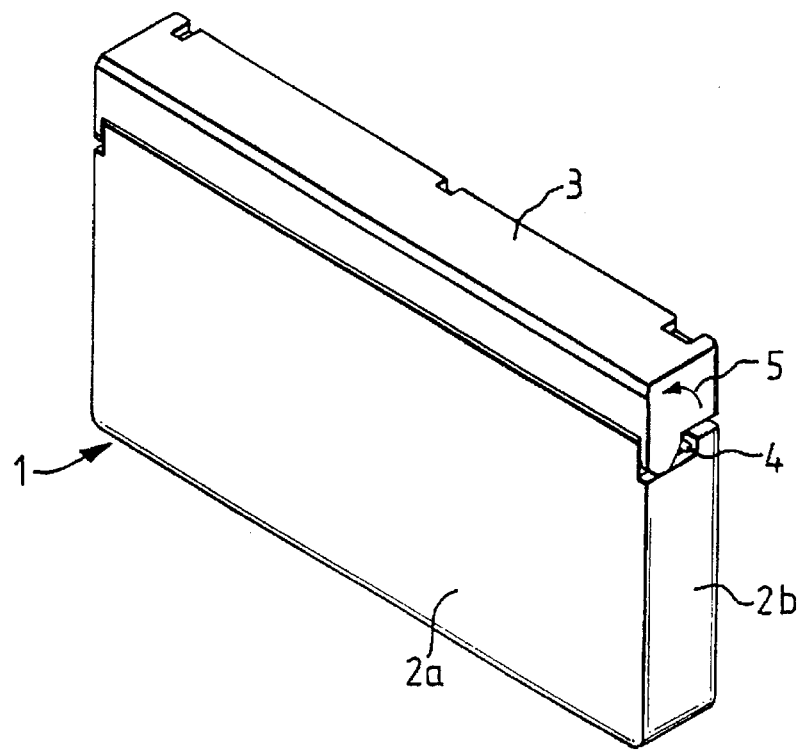
FIGS. 1a–1b perspective views of a known tape cassette.
Figure 1B:
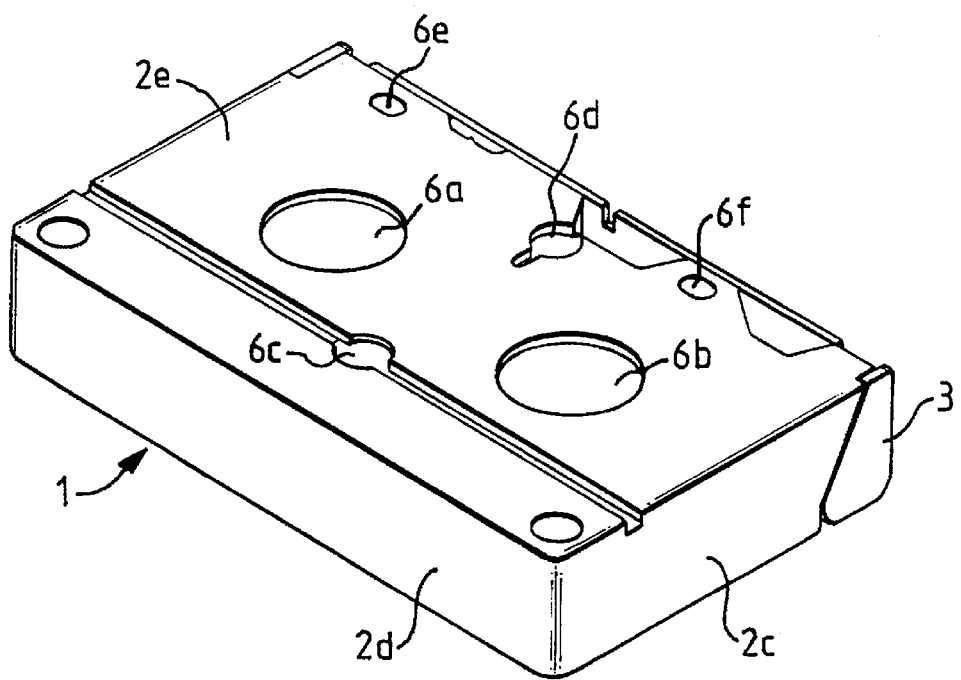

FIG. 1 shows in views a) and b) a rectangular cassette 1 according to the VHS standard containing a tape-type of information medium which is not illustrated. The cassette 1 of the known tape cassette with upper housing wall 2a, pivoting tape protection flap 3 and right-hand housing wall 2b with the locking lever 4 for the tape protection flap 3 is shown in the perspective view a) according to FIG. 1. The tape protection flap 3, which together with a housing wall hidden by the latched tape protection flap 3 forms the front side of cassette 1, is swung up in the direction indicated by an arrow 5 during the cassette loading procedure so that the information medium, hereinafter called the tape, can be drawn out from the cassette 1 by means of a drive threading mechanism, not illustrated here, for recording and/or reproduction of information. The information medium is supported on two reel-type winding units in cassette 1, also not illustrated here.

The rear housing wall 2d, the left-hand housing wall 2c, the tape protection flap 3 and the lower housing wall 2e of the cassette 1 are shown in the perspective view b) according to FIG. 1. The lower housing wall 2e, which forms the drive side of cassette 1, contains various openings 6a through 6f, whereby openings 6a, 6b are provided for engaging the drive spindles in the winding reels and openings 6e, 6f are provided as catch apertures for positioning the cassette 1 on a drive chassis 7 (FIG. 2, FIG. 3 and FIGS. 8 through 12). The further, invention-type use of the catch apertures 6e, 6f will be described in the following.

The terms "right", "right-hand", "left", "left-hand", "front" and "rear" are here applied with reference to the direction in which the cassette 1 is inserted into a cassette receiving device 10 (FIG. 3) of a cassette loading facility.

Figure 2:
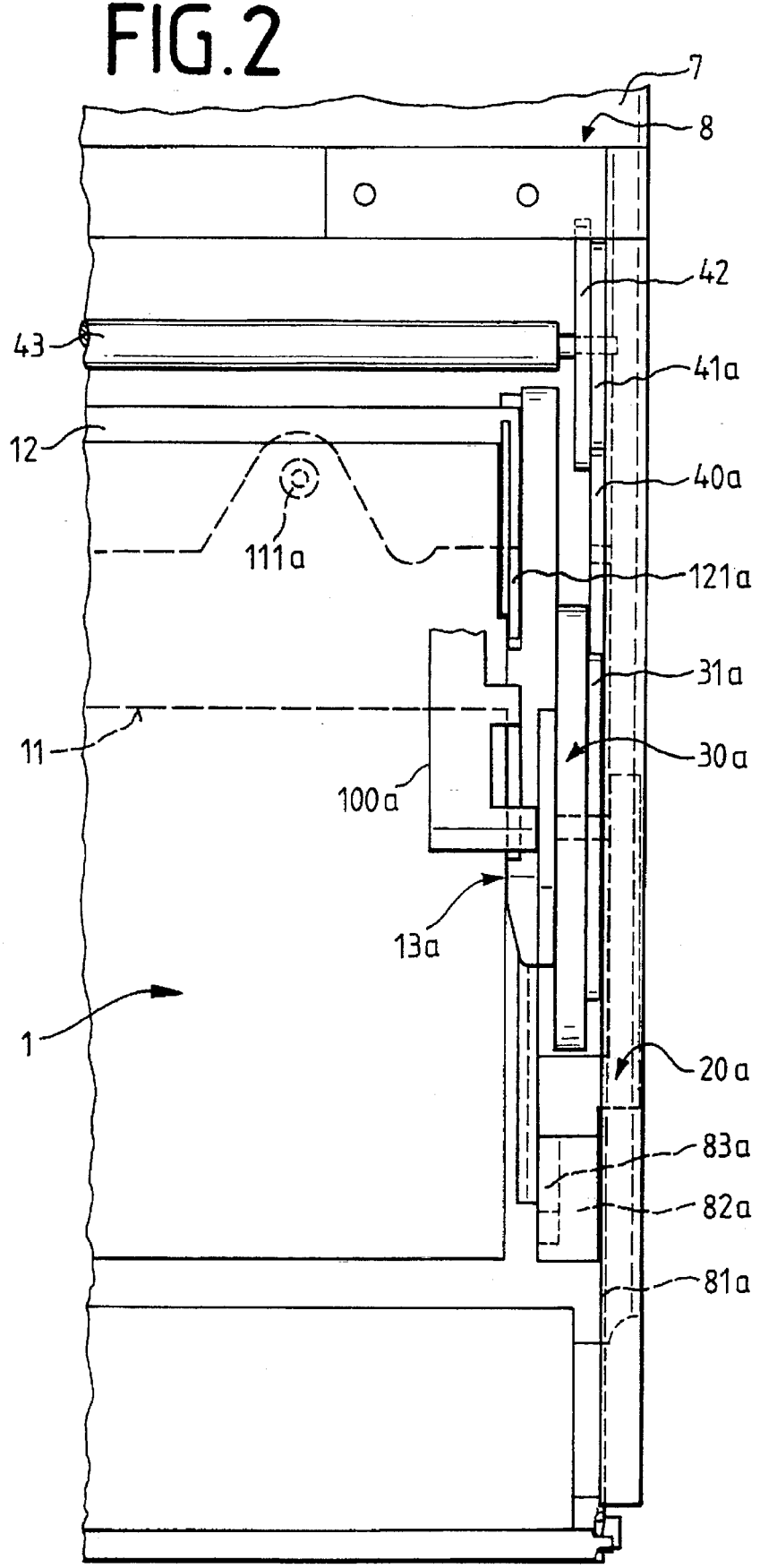
FIG. 2 a plan view of a side area of a drive chassis with a cassette loading facility for a tape cassette, FIG. 3 a front view of a cassette loading facility on the drive chassis according to FIG. 2.
Figure 3:
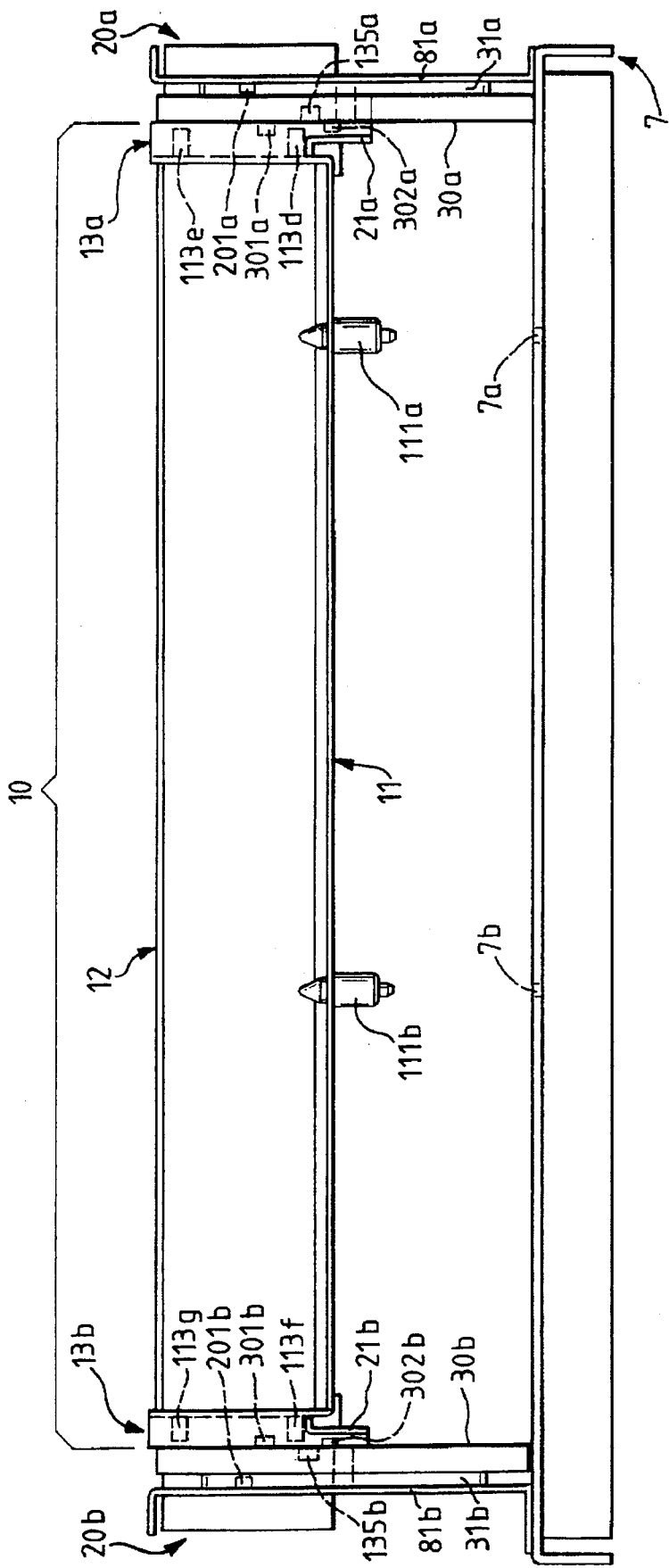

In accordance with FIGS. 2 and 3 the drive contains a chassis 7 upon which a cassette loading facility is mounted. The cassette loading facility consists essentially of a guide frame 8, a moveable cassette receiving device 10, illustrated in detail in FIG. 3, lifting mechanisms 20a; 20b which can be moved in synchronization perpendicular to the chassis 7, and plate cams 30a; 30b driven in synchronization, by means of which the cassette receiving device 10 and guides are driven and controlled with the aid of pegs 201a, 301a, 302a, 135a; 201b, 301b, 302b, 135b.

In FIG. 1 through FIG. 3 as well as in the subsequent FIGS. 4 through 12 and FIG. 14, identical items are provided with the same reference numbers. As both sides of the cassette loading facility are built essentially equal, only one side is illustrated in detail.

The plate cams 30a, 30b, the right-hand one 30a of which is shown in detail (FIGS. 8 through 12 and FIG. 14), are each driven via a toothed gearing. Both toothed gearing arrangements, the right-hand one of which is formed by the gear wheels 31a, 40a, 41a, 42, are coupled with each other via a synchronizing shaft 43. The drive for the cassette receiving device 10 is achieved on the right-hand side by means of a motor acting through a spindle, both of which are not illustrated, whereby said spindle engages with the gear wheel 42. The transfer of power for driving the left-hand side of the cassette receiving device 10 is achieved via the synchronizing shaft 43. The axes of the gear wheels in both transmissions are arranged in lateral walls 81a; 81b of the guide frame 8 which are perpendicular in relation to the chassis 7. Each plate cam 30a; 30b and a corresponding gear wheel 31a; 31b as well as gear wheels 41a and 42 on the right-hand end of the synchronizing shaft 43 have a common axis, and not only the two gear wheels 41a, 42 but also the two plate cams 30a; 30b with the gear wheels 31a; 31b are manufactured preferably in one piece.

The cassette receiving device 10 consists of a first pivoted lever 11, a second pivoted lever 12 and sliders 13a; 13b which can be moved in synchronization and which engage with always one rail-type guides 21a; 21b built onto the respective lifting mechanism 20a; 20b.

Figure 4:
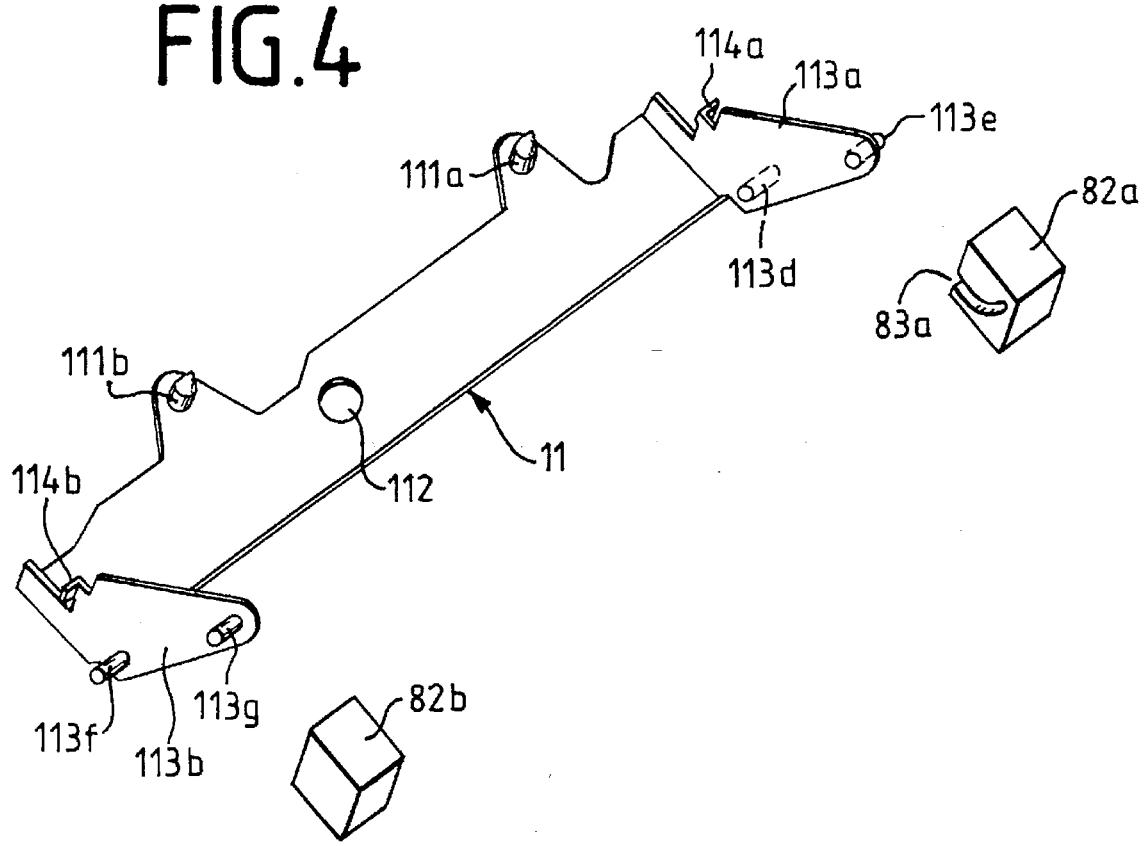
FIG. 4 a perspective view of a first pivoted lever in the cassette receiving device of the cassette loading facility according to FIG. 3 with positioning pegs for the cassette according to FIG. 1.
Figure 5:
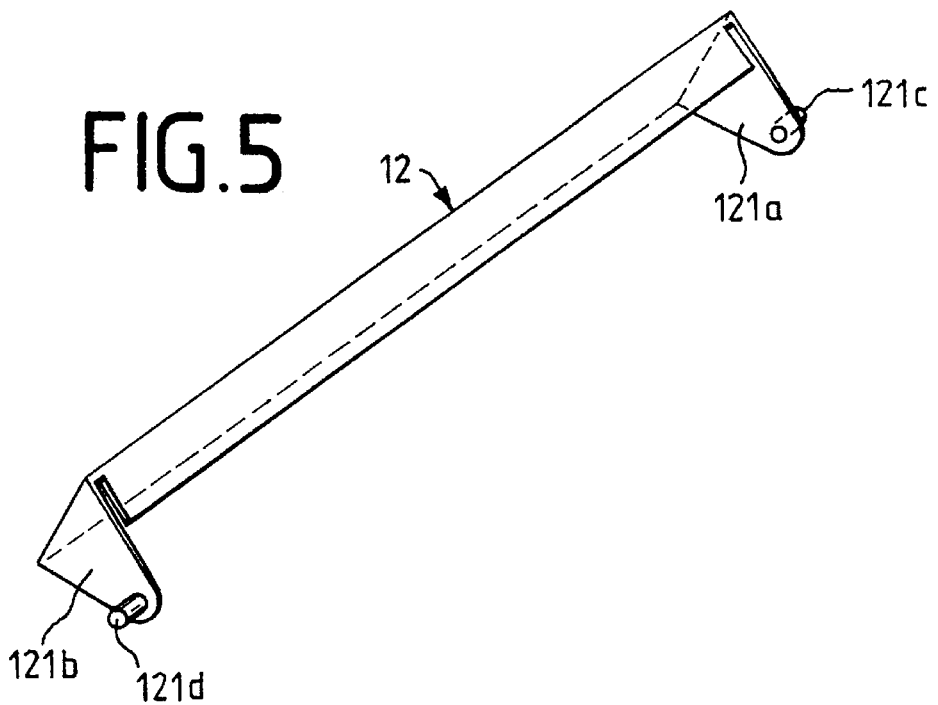
FIG. 5 a perspective view of a second pivoted lever in the cassette receiving device of the cassette loading facility according to FIG. 3.
Figure 9:
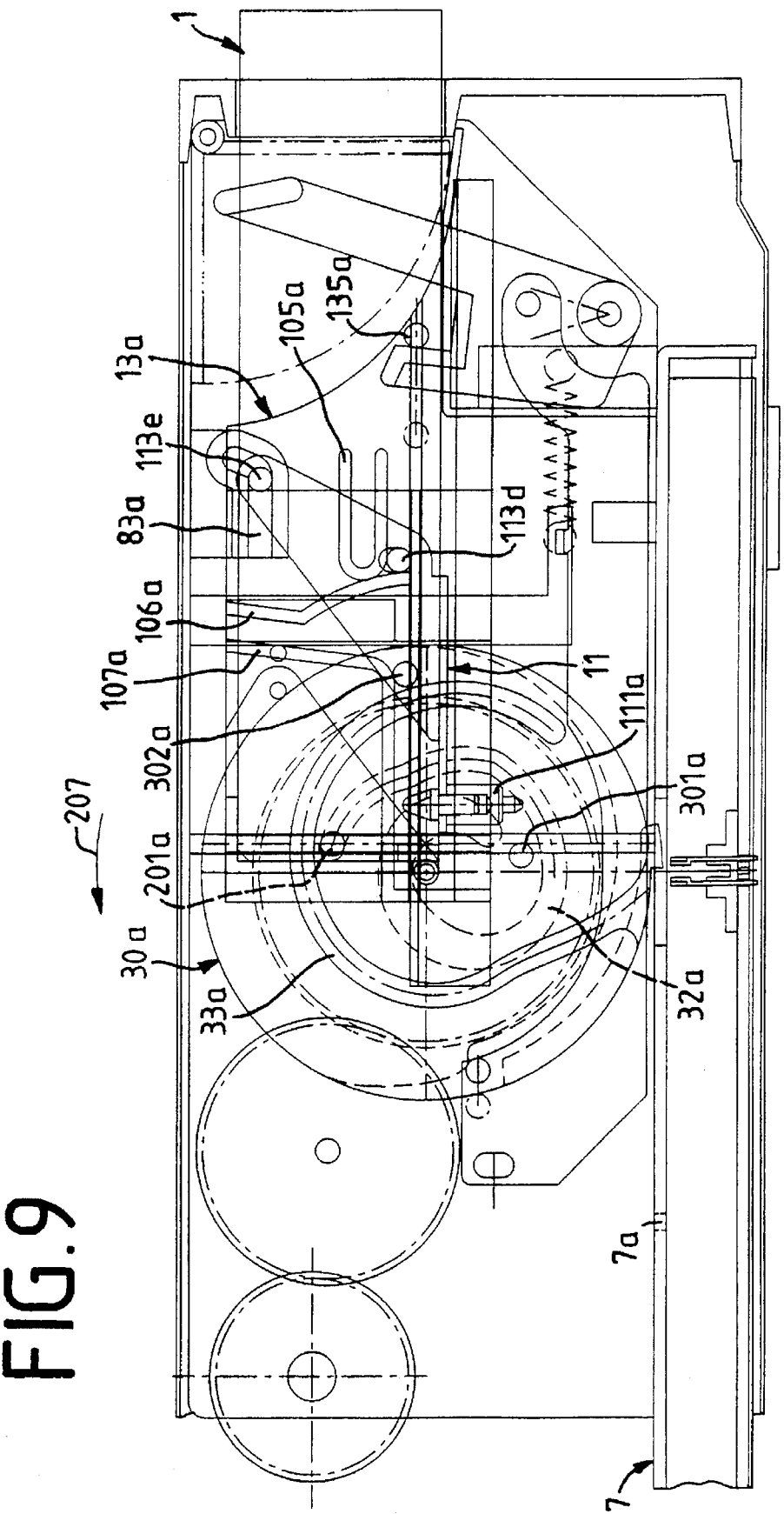
FIG. 9 a first intermediate position of the cassette receiving device during the loading or, respectively, unloading procedure.
Figure 10:
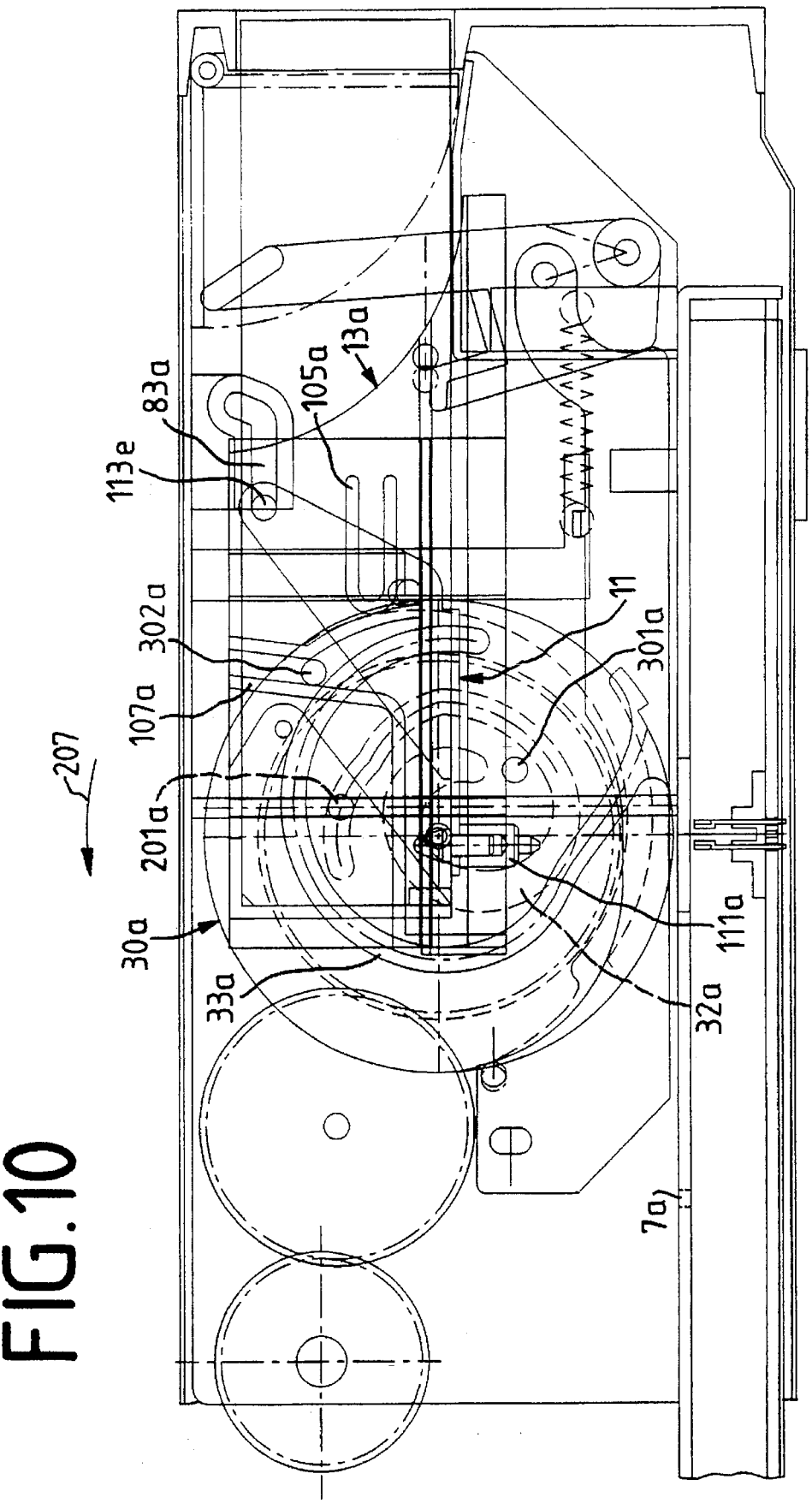
FIG. 10 a second intermediate position of the cassette receiving device during the loading or, respectively, unloading procedure.
Figure 11:
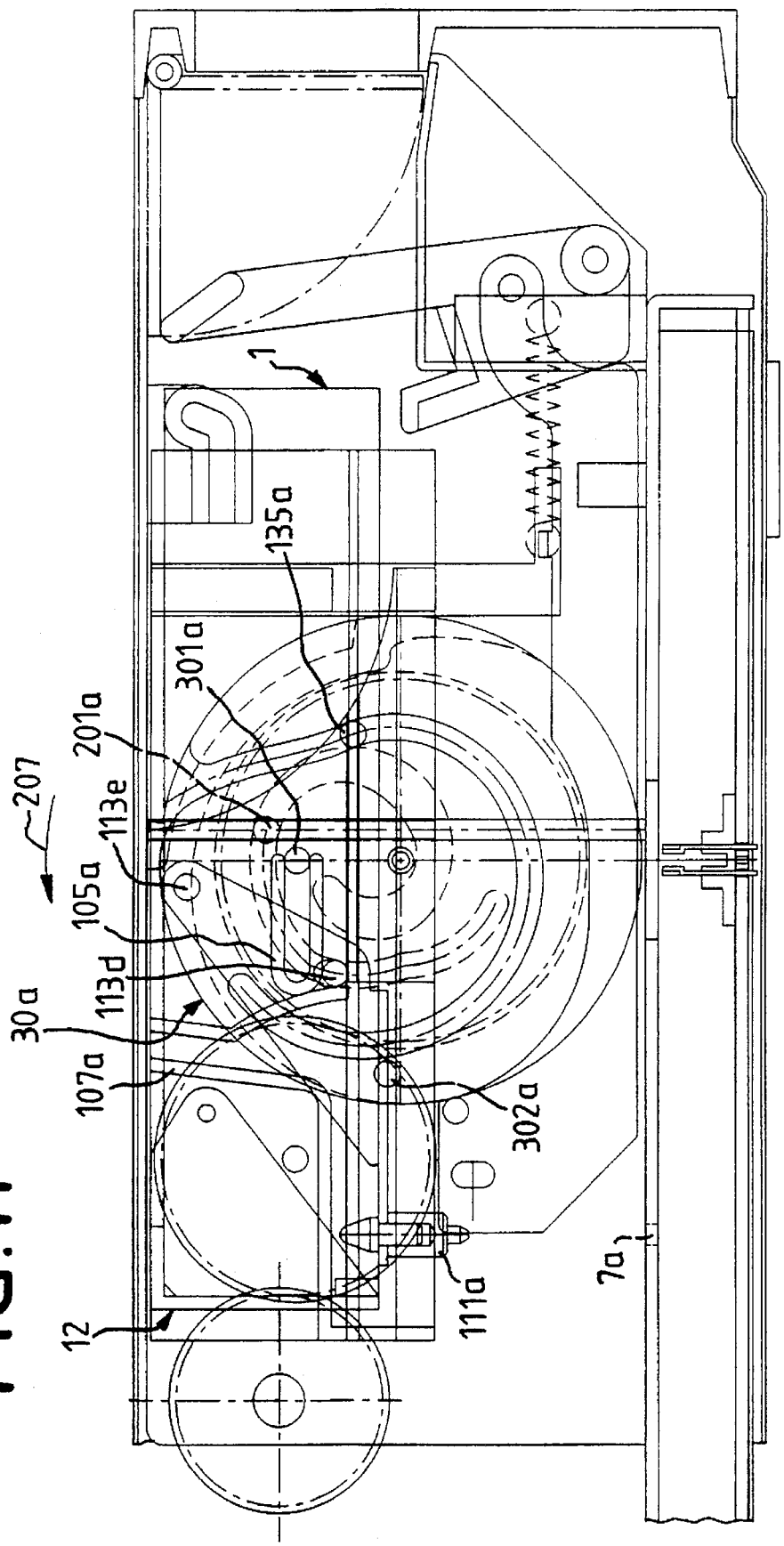
FIG. 11 a third intermediate position of the cassette receiving device during the loading or, respectively, unloading procedure.

The first pivoted lever 11, illustrated in FIG. 4, has recesses as well as two tab-type extensions, each of which carries a positioning pin 111a, 111b. The arrangement of the pins 111a; 111b is predetermined by the position of the catch apertures 6e; 6f of the cassette 1. The recesses as well as an opening 112 in the first lever 11 are also predetermined by the cassette 1. The opening 112 is provided for the cassette drawer LED, known as such, with which, in conjunction with the known tape sensors, the tape transport can be monitored. The upper part of the positioning pins 111a; 111b is provided for engaging with the respective catch aperture 6e; 6f, while the lower part of these pins 111a; 111b is provided for positioning and arresting the cassette 1 on the chassis 7 through correspondingly arranged centering apertures 7a; 7b. With regard to the position of the cassette receiving device 10 during the loading or, respectively, unloading procedure, FIGS. 2 and 3 correspond to the one which is shown in FIG. 11. In this position the positioning pins 111a; 111b have already been swung into the catch apertures 6e; 6f. FIGS. 8 through 12 show the individual phases of the movement of the cassette receiving device 10 in the cassette loading facility during the loading or, respectively, unloading procedure.

Further, the first pivoted lever 11 has on beth sides a lever extension 113a; 113b bent out at right angles. Two pegs 113d, 113e; 113f, 113g are mounted on each of the lever extensions 113a; 113b, whereby two 113d; 113f of said pegs engage with a guide in the form of an extended hole in sliders 13a; 13b. The other pegs 113e; 113g catch in a rectangular dent on the upper end of the respective slider 13a; 13b. The right-hand slider 13a is illustrated in FIG. 7. It contains the guide 131a in the form of an extended hole for the peg 113d and the aforementioned rectangular dent 133a for the peg 113e, as well as another guide 132a in the form of an extended hole for another peg 121c which is mounted on a lever extension 121a bent out at right angles of a second pivoted lever 12 according to FIG. 5.

This pivoted lever 12 is shaped like a tape protection flap 3. It is used to transfer insertion and ejection forces via the cassette 1 to the cassette receiving device 10 or from the cassette receiving device 10 to the cassette 1 respectively. When the cassette 1 drops into its operating position the second pivoted lever 12 and the tape protection flap 3 are swung upwards together by means of a locally fixed, block-type device which is not illustrated. Mounted on this device is a ramp-type arm, not illustrated, which serves for actuating an unlocking lever 134 (FIG. 7) which is arranged in the right-hand slider 13a so that it may swivel on an axis 140 and with which the tape protection flap 3 can be locked or unlocked.

Further, the cassette receiving device 10 shown in FIG. 3 has a vertical guiding element on both sides for the cassette 1, the right-hand vertical guiding element 100a of which is illustrated in FIGS. 2 and 7. Both vertical guiding elements are disposed on the sliders 13a; 13b. They also form an end support for the cassette 1 when the tape protection flap 3 and the second pivoted lever 12 are swung upwards. Both vertical guiding elements are designed as double-action leaf springs, whereby both ends of the spring are preferably pretensioned (biased) and are supported on the respective slider 13a; 13b. With the insertion of a cassette 1 into the cassette receiving device 10 and the subsequent drawing-in of the cassette as well as with the cassette ejection process, there exists a slight play between the ends of the leaf springs and the upper wall 2a of the cassette housing. The aforementioned frictional engagement for holding the cassette 1 is not necessary because the cassette 1 is already arrested during the loading/unloading procedure by means of the positioning pins 111a, 111b mounted on the first pivoted lever 11. Upon reaching the operating position (according to FIG. 12), the upper housing wall 2a of cassette 1 comes into contact with the ends of the leaf springs of both vertical guiding elements owing to the positioning of the pegs 113d, 113f; 121c, 121d of the first and second pivoted levers 11; 12 in the guides in the sliders 13a; 13b which guides are constructed in the form of extended holes perpendicular to the chassis 7. In doing this, the ends of the leaf springs are lifted from the sliders 13a, 13b and hold the cassette on the chassis 7.

Figure 8:
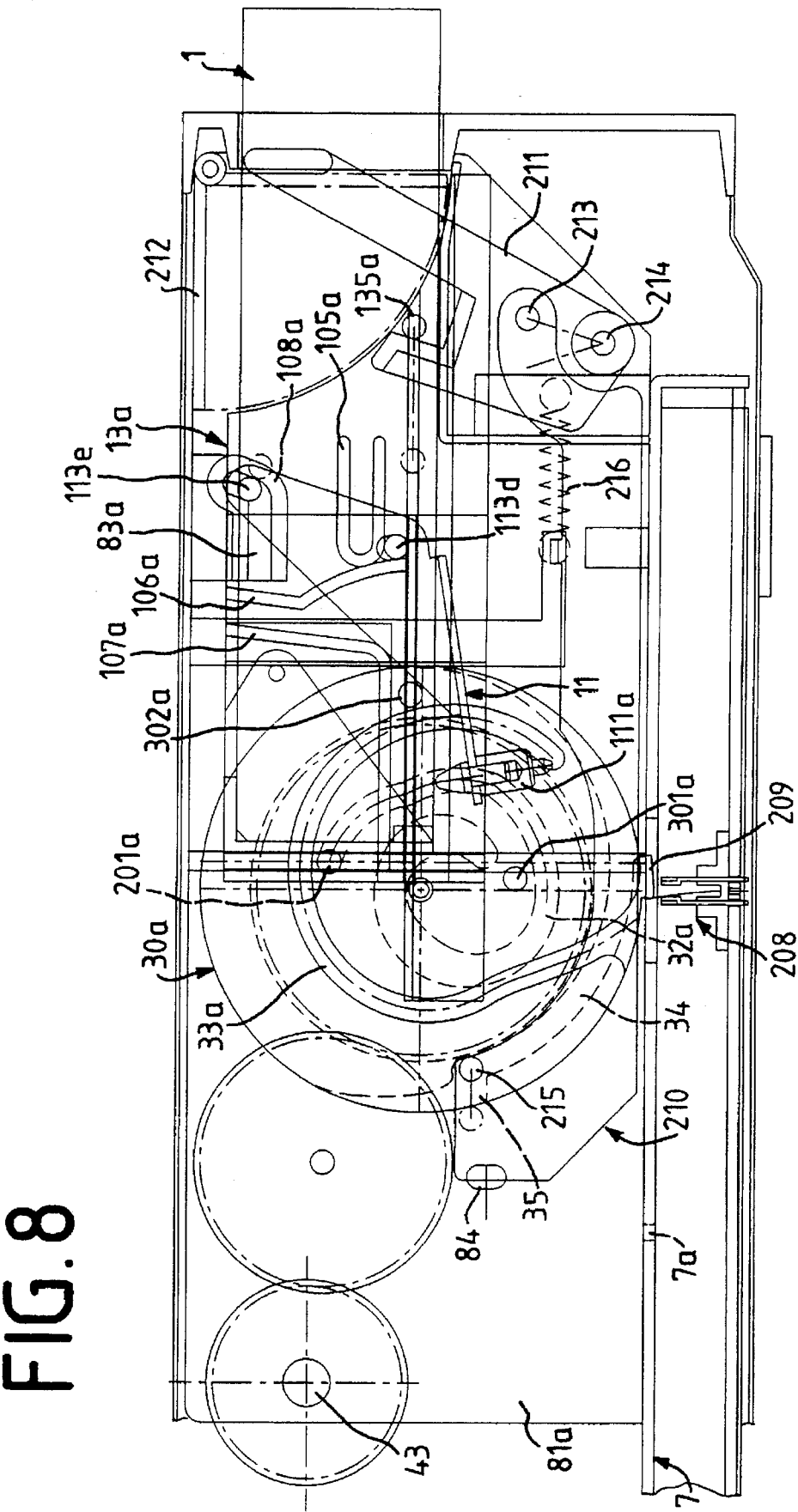
FIG. 8 the loading or, respectively, unloading position of the cassette receiving device.

The swiveling control for the first pivoted lever 11 is achieved by means of two guiding elements 82a; 82b, shown in FIG. 4, mounted on the side walls 81a; 81b, whereby said guiding elements have a control groove which is engaged with the respective peg 113e; 113g in the loading or unloading position respectively. FIG. 4 shows the shape of the control groove 83a of the right-hand guiding element 82a. The shape of the control groove determines the swiveling of the first pivoted lever 11 into a first postion in which the positioning pins 111a, 111b release the cassette 1 so that, as shown in FIG. 8, the cassette can be removed from or completely inserted into the cassette receiving device 10 respectively, and the swiveling into a second position in which the positioning pins 111a; 111b engage with the catch apertures 6e; 6f of the cassette 1. The pegs 113d; 113f of the first pivoted lever 11, which are engaged with the guides formed as extended holes in the sliders 13a; 13b, form the swiveling axis in this case.

Apart from that, protection for the cassette receiving device 10 and the cassette 1 in the event of a wrongly inserted cassette 1 is guaranteed by the shape of the control groove of the guiding elements 82a; 82b and by the first pivoted lever 11. Otherwise, the positioning pins 111a, 111b would hit a housing wall of the cassette 1. In the case of a wrongly inserted cassette 1 the first pivoted lever 11 cannot execute the necessary swiveling movement in which the pegs 113e; 113g are moved out of the guiding elements 82a; 82b, as shown in FIGS. 8 through 10.

The lifting mechanism 20a is shown in three side views a) through c) in FIG. 6.

View a) shows the right-hand lifting mechanism 20a looking towards the inside of the right-hand wall 81a. View b) shows a sectional view taken along the section line AB, and view c) a section along section line CD.

The lifting mechanism 20a has an external, block-type sliding element 202a as well as an internal, block-type sliding element 203a. A first and second guide 204a; 205a are formed in the wall 81a perpendicular to the chassis 7. Engaged with the first guide 204a is a fin 206a, through which the internal sliding element 203a is coupled with the external sliding element 202a. The peg 201a formed on the external sliding element 202a is guided in the second guide 205a. The peg 201a engages with an aforementioned first helical guide groove (element) 32a of the control disk (plate cam) 30a, illustrated in FIGS. 8 through 12 and FIG. 14. The rail-type guide 21a for slider 13a is mounted on the internal sliding element 203a according to view b) in FIG. 6.

FIG. 7 shows the right-hand slider 13a in three side views.

View a) shows the side facing the cassette 1. The slider 13a, swung through 90° about an axis E, is shown in view b), and in view c), swung through 180° about an axis F.

The side of the slider 13a facing the cassette 1 contains a first recess 137a for the first pivoted lever 11, a second recess 138a for the second pivoted lever 12 and a third recess 130a located within the first recess 137a for the arrangement of the vertical guiding element 100a and for a check (stop) fin 114a on the right-hand extension 113a of the first pivoted lever 11 and projecting into the vertical part of the recess 130a. A stretched spring element 139a reaches into the dent 133a into which the peg 113e of the first pivoted lever 11 engages. Using said spring element and the corresponding one on the left-hand side of the cassette receiving device 10, the positioning pegs 111a; 111b are prevented from swinging out from the catch apertures 6e; 6f of the cassette 1.

As shown in FIG. 7, the side facing the cassette 1 also has two guide fins 14a arranged in a row for the cassette 1 which serve as a cassette support.

View c) in FIG. 7 shows the side of the slider 13a facing the control disk 30a. This side has guides, formed by the boundaries of two recesses 103a; 104a, for the first 301a and second 302a drive spigots (pegs) of the control disk 30a. The cassette receiving device 10 is driven by means of these guides, as is shown in FIGS. 8 through 12. Further, this side has the peg 135a as well as a continuous guide 136a complementary to the rail-type guide 21a of the lifting mechanism 20a.

FIGS. 8 through 12 show the guides formed, in FIG. 7, by recesses 103a, 104a as well as the control groove 83a in a modified form as raised fins 105a; 106a, 107a; 108a. This is merely a different production model of the sliders 13a, 13b and the locally fixed guiding elements 82a, 82b serving for the swiveling control of the first pivoted lever 11.

The FIGS. 8 through 12, based on design drawings, illustrate individual phases in the movement of the cassette receiving device 10. They show the right side of the cassette loading facility at an enlarged scale.

FIG. 8 shows the cassette receiving device 10 in the loading and unloading position respectively with the cassette 1. In this position the peg 113e on the first pivoted lever 11 engages with the upwardly inclined end piece of the fixed control groove 83a. The same applies to the left side of the arrangement. Using the upwardly inclined end piece of the control groove 83a and the corresponding control groove in the left-hand guiding element 82b, the first pivoted lever 11 is swung away from cassette 1 about the rotational axis of the right- and left-hand pegs 113d; 113f so that the positioning pins 111a; 111b are not engaged with the catch apertures 6e; 6f of the cassette 1.

FIG. 9 shows the peg 113e as it enters the section of the control groove 83a running parallel to the chassis 7. In this position the first pivoted lever 11 has already been swung towards the cassette 1 about the rotational axis of the right- and left-hand pegs 113d; 113f so that the positioning pins 111a; 111b are engaged with the catch apertures 6e; 6f. However, before peg 113e enters the section of the control groove 83a running parallel to the chassis 7, the motor drive for the cassette receiving device 10 is activated. As peg 113e enters the section of the control groove 83a running parallel to the chassis 7, the second drive spigot 302a, mounted on control disk 30a, engages with fin 107a, and the second drive spigot 302b, mounted on the left-hand control disk 30b, engages with the corresponding left-hand fin. The direction of rotation of the plate cams 30a; 30b for the loading is indicated by an arrow 207.

As shown in FIG. 10, the cassette receiving device 10 is driven so far by means of the second drive spigots 302a, 302b that it succeeds in reaching a position above the operating position. Upon attaining this position, the second drive spigot 302a leaves the fin 107a and, correspondingly, the left-hand second drive spigot 302b leaves the corresponding left-hand fin, as shown in FIG. 11. At the same time, the first peg 301a, mounted on control disk 30a, engages with the fin 105a and the first peg 301b, mounted on the left-hand control disk 30b, engages with the corresponding left-hand peg, thereby taking over the further driving of the cassette receiving device 10 into the operating position according to FIG. 12.

Figure 12:
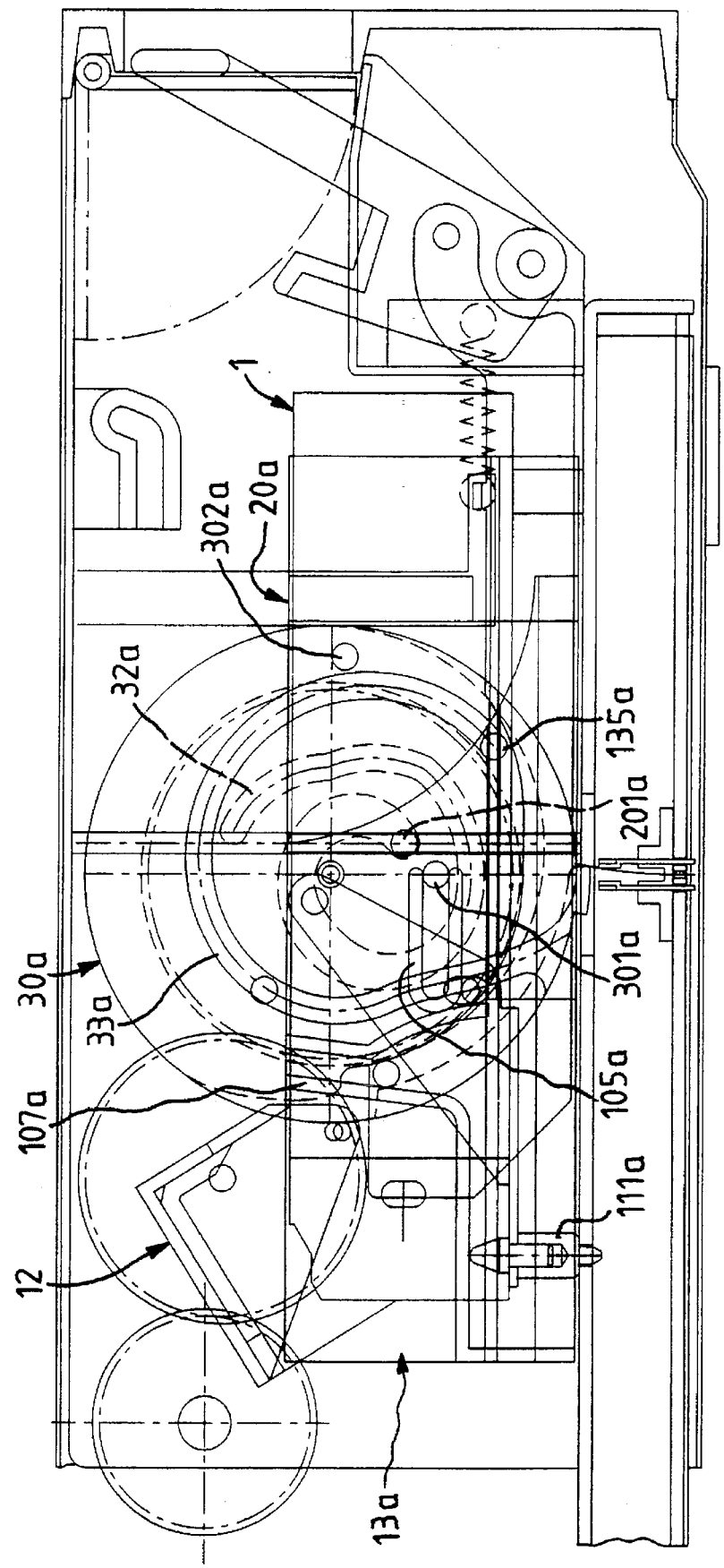
FIG. 12 the operating position of the cassette receiving device.

FIG. 12 shows the operating position of the cassette 1. The lifting of the cassette receiving device 10, illustrated in FIG. 11, is effected by the first helical guide groove 32a in the control wheel (disk) 30a and the corresponding left-hand first helical guide groove in the left-hand control wheel 30b with which the pegs 201a; 201b of lifting mechanisms 20a; 20b are engaged.

However, before the second drive spigot 302a leaves the fin 107a and the left-hand second drive spigot 302b the corresponding left-hand fin, the peg 135a provided on slider 13a engages with a second guide groove 33a in the control disk 30a, and the peg 135b provided on the left-hand slider 13b engages with the corresponding second helical guide groove in the left-hand control disk 30b, and thereby take over the guiding of the cassette receiving device 10 during lowering into the position according to FIG. 12.

The procedures described are synchronized on both sides using the synchronizing shaft 43.

The shape of the helical guide grooves formed in the control disks 30a; 30b and of the fin-type guides on the sliders 13a; 13b, as well as their positions in relation to each other, determine the speed progression of the drive speed for the cassette receiving device 10. As the cassette 1 is arrested during the entire loading and unloading procedure respectively, the average loading/unloading speed can be raised, thereby considerably reducing the loading and unloading procedures.

The loading/unloading position as well as the operating position of the cassette receiving device 10 is detected with a sensor 208 fixed in position. A switching element actuated by a toe (projection) 209 located on the periphery of the right-hand control disk 30a, thereby sending out a signal corresponding to the loading or operating position, serves as the sensor 208. Said signal is fed to an evaluation input of an electronic control circuit which is not illustrated; said circuit performs the procedural control for the drive mechanism and the cassette loading facility as well as monitoring the tape drive.

The activation of the motor drive for the cassette receiving device 10 is carried out using one of the two tape-end sensors, no shown, through shading (covering) one of the tape-end sensors with respect to the aforementioned cassette drawer LED. The tape-end sensors are arranged on the chassis 7, left and right respectively of the wall 81a; 81b in a known manner, and each of them is connected to an evaluation input of the electronic control circuit. In the embodiment example, the right-hand tape-end sensor is used for this. The above-mentioned shading is achieved through a sliding blind 210. The sliding blind 210 is mounted on the right-hand wall 81a so that it may move horizontally, and is coupled via a connector peg 213 to a right-hand lever 211 so that it may rotate, whereby said lever, together with the corresponding left-hand lever, forms a stop upon closing the cassette drawer by way of a cassette drawer flap 212 known as such. Both levers are coupled with each other by means of a shaft 214 mounted on the walls 81a, 81b. Both levers, in the positions according to FIGS. 8 through 10, are also engaged with the pegs 135a; 135b mounted on sliders 13a; 13b owing to the action of an energy accumulator 216 acting upon the sliding blind 210 and the right-hand wall 81a, so that at the start of the loading procedure, both levers, and hence the sliding blind 210 too, can be actuated by the cassette receiving device 10.

In order that the tape drive may be monitored, the right-hand slider 13a and the right-hand wall 81a each have a correspondingly located hole. The FIGS. 8 through 12 show the hole 84 in the wall 81a.

In the loading or the unloading position respectively the drive for the cassette receiving device 10 is not yet activated by the drive motor because in this position, the sliding blind 210 does not yet fully close the hole 84 and hence cannot shade the tape-end sensor. The deactivation of the drive at the end of the loading and preferably at the end of the unloading procedure too, is carried out by means of the sensor 208 detecting the loading/unloading and operating position of the cassette receiving device 10.

A peg 215 is disposed on the end of the sliding blind 210 furthest from the lever 211, and said peg is provided for engaging with an arc-shaped third guide groove 34 on the right-hand control disk 30a, whereby the energy accumulator 216 has the effect that the peg 215 on the sliding blind 210 can engage with the third guide groove 34 on the control disk 30a. As shown in FIGS. 8 through 12, the progression of movement of the right-hand 211 and corresponding left-hand lever is controlled by the peg 215 and the shape of the third guide groove 34 in such a way that the two levers can open and close the cassette drawer flap 212 during the loading and unloading procedure respectively as appropriate. Further, the energy accumulator 216 also triggers ejection of the cassette 1 if, as shown in FIG. 8, the peg 215 moves into the stepped end 35 of the third guide groove 34 at the end of the unloading procedure. The ejection of the cassette 1 means here that the two levers hereby acting on the pegs 135a, 135a, under the influence of the energy accumulator 216, move the cassette receiving device 10 into the loading or unloading position respectively. Apart from that, as can be seen from FIG. 8, upon introducing the cassette 1 into the loading/unloading position, the energy accumulator 216 cannot have an effect on cassette 1.

FIG. 13 shows the speed progression of the cassette receiving device 10 by means of a flow diagram.

The speed v is plotted on the ordinate, whereby the coordinate origin corresponds to a speed of zero. On the absciss is the loading/unloading path of the cassette receiving device 10 in the form of a loading rotational movement of the control disks 30a, 30b. Here the coordinate origin corresponds to the loading or unloading position respectively, the angle of rotation from zero to almost 180° to the horizontal movement of the cassette receiving device 10 into the position according to FIG. 11, and the angle of rotation from 180° to almost 360° corresponds to the vertical movement into the operating position according to FIG. 12. The rotational velocity of the control disks 30a, 30b is constant.

As the speed in the vicinity of the position according to FIG. 11 and at the start and at the end of a loading or unloading procedure reduces continuously to zero, loading and unloading noises as well as the mechanical loads on cassette 10 and device are considerably lowered despite a greater average speed of the cassette receiving device 10.

Figure 14C:
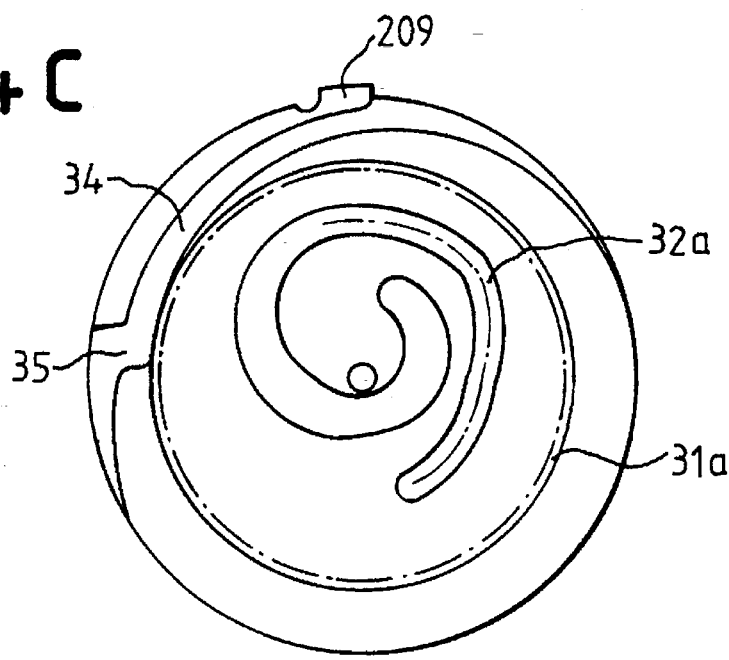
FIGS. 14a–c a plate cam (control disk) for the cassette loading facility according to FIG. 3.
Figure 14B:
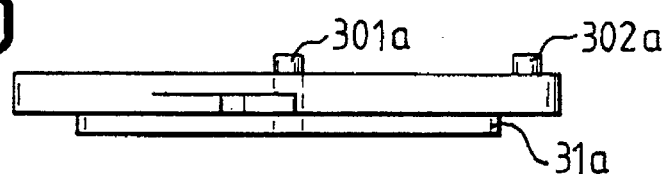
Figure 14A:
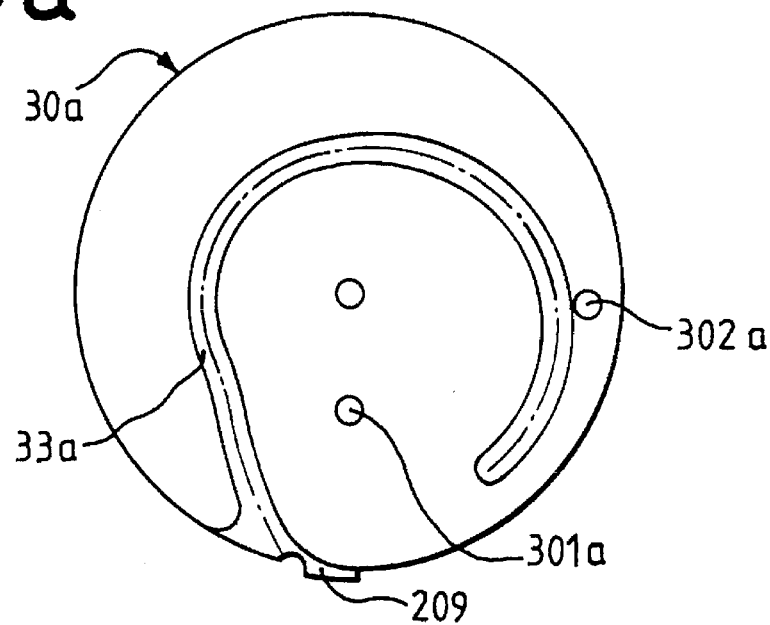

FIG. 14 shows, in three different side views a) through c), the right-hand control disk 30a, upon which the toe 209 is mounted.

View a) shows the side of the right-hand control disk 30a which faces the right-hand slider 13a in the angle of rotation position according to FIG. 8 with the first 301a and the second 302a drive spigots and the second helical guide groove 33a.

The control disk 30a pivoted through 90° about an axis G is illustrated in View b). In View c), the control disk 30a is illustrated rotated through 180° about an axis H, and consequently shows the side facing the right-hand wall 81a. Arranged on this side are the gear wheel 31a, the first helical guide groove 32a which is in engagement with the peg 201a of the lifting mechanism 20a, and the arc-shaped third guide groove 35a.

We claim:

1. Cassette loading facility for a cassette device for the recording and/or reproduction of information, said cassette loading facility having a guide frame arranged on a cassette drive chassis in a fixed position, a cassette receiving device movable between a loading position in which a cassette can be introduced into the cassette receiving device and removed therefrom and an operating position in which the recording or reproduction of information is carried out, wherein the cassette is positioned on the drive chassis by means of positioning pins and catch apertures, said catch apertures being formed on the cassette housing, and having means using the catch apertures for locking the cassette during its transportation between the loading and the operating position and also for centering it in the operation position, and having means for driving and controlling the cassette receiving device between the loading and the operating positions, characterized in that the positioning pins are fixed on a first pivoted lever which is pivotally mounted on the cassette receiving device and which can be pivoted into a first position in which the positioning pins release the cassette so that the cassette can be introduced into the cassette receiving device and removed therefrom, and can be pivoted into a second position, in which the positioning pins engage with the catch apertures, and that upon reaching the operating position, the lower ends of the positioning pins each engage with a set of correspondingly arranged centering apertures in the drive chassis, a control disk having a first and second drive spigot is provided to the left and right of the loading facility, wherein the control disks are driven in synchronization, and wherein the cassette receiving device is driven with the first and second drive spigots, essentially engaging successively in corresponding guides of the cassette receiving device, and whereby the horizontal and the vertical movement of the cassette receiving device between the loading and the operating position is controlled with the aid of pegs and further guides, a first helical guide groove is disposed on each control disk on the side facing away from the cassette receiving device, and said groove engages with the peg mounted on a vertically movable lifting mechanism of the loading facility, and that a second helical guide groove is disposed on each control disk on the side facing the cassette receiving device, and said groove is provided for engaging with the peg disposed on the cassette receiving device, a third helical guide groove is disposed on the side of the right-hand control disk facing away from the cassette receiving device, and said groove is provided for controlling a cassette drawer flap as well as for controlling a sliding blind which is mounted on the right-hand wall such that is moved horizontally and with which, in the loading position of the cassette receiving device, a tape-end sensor serving for the monitoring of the tape drive is shaded, and that through the shading of this tape-end sensor in the loading position of the cassette receiving device, the motor drive for the cassette receiving device is activated for the loading procedure.

2. Cassette loading facility according to claim 1, characterized in that one of said pegs mounted on the sliding blind and provided for engaging with the third guide groove is permanently engaged with the right-hand control disk through the action of an energy accumulator, which provides biasing for engagement of the peg and the third guide groove and assists in the ejection of the cassette.

3. Cassette loading facility according to claim 1, characterized in that the sliding blind is coupled to a right-hand swiveling lever that it can rotate, whereby said lever forms, together with a corresponding left-hand lever, a stop for the cassette drawer flap upon closing the cassette drawer.

4. Cassette loading facility according to claim 3, characterized in that with an unloading procedure, prior to reaching the loading position of the cassette receiving device, the lever and the corresponding left-hand lever engage with the pegs of the cassette receiving device.

5. Cassette loading facility according to claim 3, characterized in that the cassette is ejected at the end of the unloading procedure of the cassette receiving device by the action of the energy accumulator acting via the sliding blind on the lever and the corresponding left-hand lever.

* * * * *